UNITED STATES PATENT OFFICE.

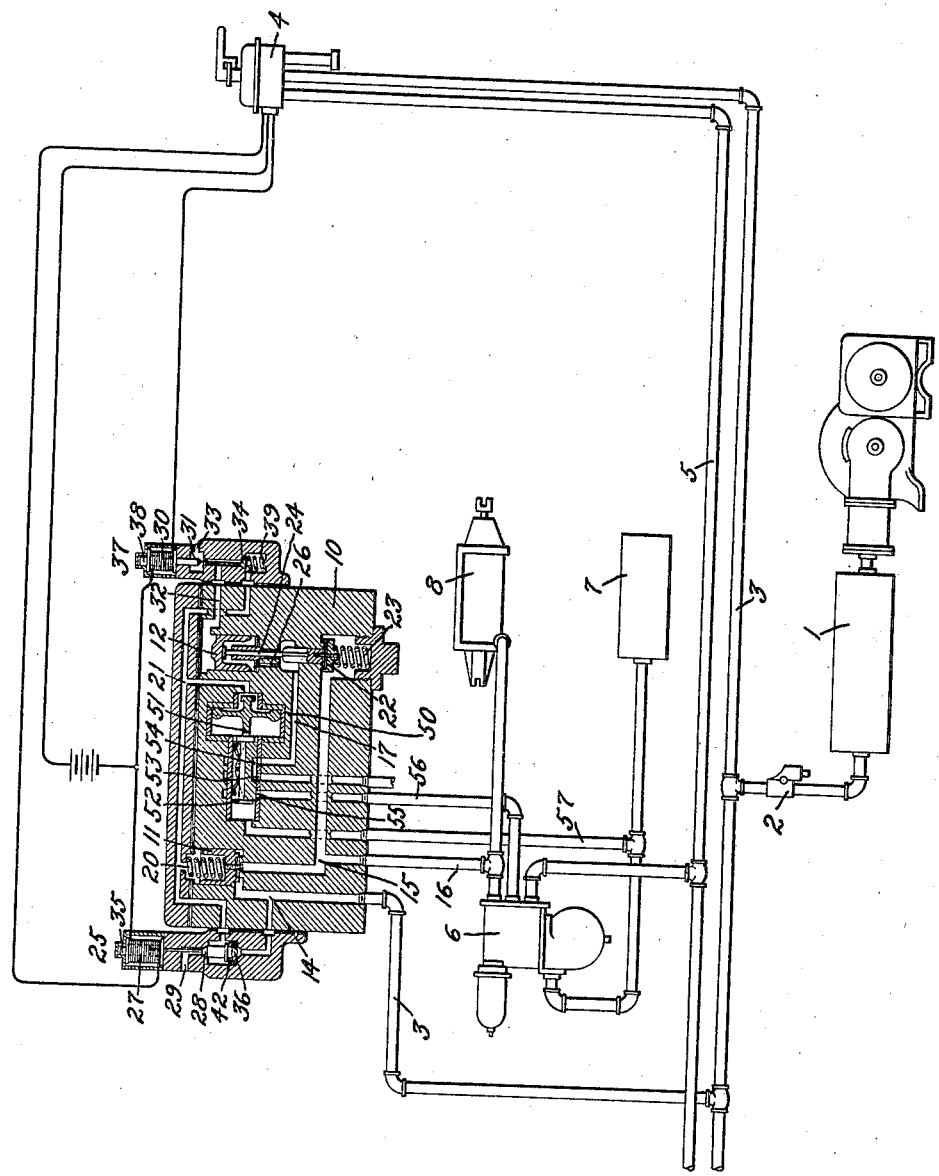

GEORGE MACLOSKIE, OF ERIE, PENNSYLVANIA, ASSIGNOR TO GENERAL ELECTRIC COMPANY, A CORPORATION OF NEW YORK.

ELECTROPNEUMATIC BRAKE.

1,390,055.  Specification of Letters Patent.  Patented Sept. 6, 1921.

Application filed January 17, 1921. Serial No. 437,654.

*To all whom it may concern:*

Be it known that I, GEORGE MACLOSKIE, a citizen of the United States, residing at Erie, in the county of Erie, State of Pennsylvania, have invented certain new and useful Improvements in Electropneumatic Brakes, of which the following is a specification.

My invention relates to automatic fluid pressure brakes and more particularly to brakes which are provided with additional electrically controlled mechanism whereby the brakes may be controlled either by variations in the brake pipe pressure or by the operation of the electrically controlled mechanism.

With a construction of the above character, it is necessary that the exhaust port of the triple valve be closed upon air being supplied to the brake cylinder by means of the electrically controlled mechanism in order to prevent the air admitted to the brake cylinder from escaping through this exhaust port.

It is one object of my invention to provide an improved means for cutting off communication between the exhaust port of the triple valve and atmosphere upon the operation of the electrically controlled mechanism to supply air to the brake cylinder.

Another object of my invention is to provide an arrangement whereby an electric and pneumatic application of the brakes may be made at the same time thereby enabling a very quick application of the brakes to be made.

My invention will be better understood from the following description taken in connection with the accompanying drawing, and its scope will be pointed out in the appended claims.

In the accompanying drawing, the single figure is a diagrammatic view partly in section of an air brake equipment embodying my invention. As shown in the drawing, the pneumatic brake comprises a main reservoir 1 connected through a feed valve 2 to the control pipe 3, a motorman's valve 4, brake pipe 5, triple valve 6, an auxiliary reservoir 7 and a brake cylinder 8 which is all standard apparatus. In addition to this standard apparatus, I provide the valve device 10 which is shown in section and is provided with an application valve 11 controlling the connection between the passage 14 which leads to the control pipe 3 and a passage 15 connected to the brake cylinder pipe 16 which leads to the brake cylinder 8, and a release valve 22 which controls the connection between the passage 15 and a passage 17. One side of the application valve 11 is subject to the pressure of a spring 20 and also to the pressure in the passage 21. A portion of the area of the other side of the valve is connected to the passage 14 and therefore is subject to the control pipe pressure. The release valve 22 is subject on one side to the pressure of a spring 23 and the pressure in the brake cylinder passage 15. 12 designates a piston which is connected to the opposite side of the valve 22 by means of a rod 24. One side of the piston 12 is connected to the passage 17 by the small passage 26 and the opposite side of the piston 12 is connected to the passage 32. 25 designates an application magnet valve which consists of a coil 27 and a plunger 35 connected to a valve 28 for venting air from the passage 21 through the exhaust passage 29 and a valve 36 for cutting off the communication between the passage 14 and the passage 21. A spring 42 holds the valves 28 and 36 in the position shown in the drawing when the coil 27 is deënergized. 37 designates a release magnet valve which consists of a coil 30 and a plunger 38 connected to the valve 31 for venting air from the passage 32 to the exhaust passage 33 and a valve 34 for cutting off communication between the passages 32 and 21. A spring 39 holds the valves 31 and 34 in the position shown in the drawing when the coil 30 is deënergized. In accordance with my invention a valve device 50 comprising a piston 51, slide valve 52, exhaust port 53, a port 54 leading to the passage 17 and a port 55 connected by pipe 56 to the usual exhaust port of the triple valve is provided to control the connection between the triple valve exhaust port and atmosphere. One side of the piston 51 is connected to the passage 21 and the opposite side is connected by pipe 57 to the auxiliary reservoir 7. The valve device 50 is so designed that the piston and slide valve remain in whichever position they are moved as long as the pressures on both sides of the piston are substantially equal. The slide valve 52 is arranged in one position to establish communication between the exhaust port 53 and the passage 17 and to blank the exhaust port 56 of the triple valve 6, and in the other position to establish communication between the exhaust port 56 of the triple valve and the exhaust port 53 and to blank the passage 17.

The operation of the embodiment of my invention shown is as follows:—With the motorman's valve 4 in lap position and both of the magnet valves deënergized, air under pressure is supplied from the control pipe 3 through passage 14 and valve 36, which will be open, to the passage 21 so that air pressure is applied to both sides of the valve 11 thereby maintaining it on its seat as shown in the drawing. Consequently, the communication between the passage 14 connected to the train pipe 3 and the passage 15 connected to the brake cylinder is cut off. Air pressure is also supplied to the control pipe side of the piston 51. Since the pressures in the auxiliary reservoir 7 and the control pipe are equal as long as the brakes are not applied the opposing forces acting on the piston 51 are equal. Therefore, the piston 51 and slide valve 52 will be in the positions to which they were last moved due to air being vented from one side of the piston 51. With the release magnet valve 37 deënergized, the passage 32 is connected to the exhaust passage 33 through the valve 31 so that the valve 22 is held closed by the spring 23, thereby cutting off communication between the brake cylinder passage 15 and the passage 17 which is adapted to be connected to the exhaust port 53 when the slide valve 52 occupies the position shown in the drawing.

If it is desired to effect an electric application of the brakes the application magnet valve 25 is energized. The circuit of the coil 27 of the magnet valve may be controlled by varying the position of the motorman's valve 4. Valve 36 is thereby operated to cut off communication between the control pipe passage 14 and the passage 21 and valve 28 is operated to connect the passage 21 to the exhaust passage 29 to vent air from the passage 21. Valve 11 thereupon opens so that air is supplied from the control pipe 3 through passage 14 to the brake cylinder 8 to apply the brakes. The venting of air from the passage 21 causes the piston 51 to move to the right side of the piston chamber as viewed in the drawing, if it is not already in this position. When the piston 51 occupies this position the slide valve 52 cuts off communication between the exhaust port 53 and the port 55 leading to the exhaust port of the triple valve and establishes communication between the exhaust port 53 and the port 54 leading to the passage 17. After the brakes have been applied electrically and the application magnet valve 25 released so that the passage 21 is again supplied with air pressure from the control pipe 3 the piston 51 is not moved from this position, since the opposing pressures are equal. The brakes may be released electrically by energizing the coil 30 of the release magnet valve 37, the circuit of which may be closed through contacts on the motorman's valve 4 in a manner well known in the art. When coil 30 is energized, the valve 31 is operated to cut off communication between the passage 32 and the exhaust passage 33 and the valve 34 is opened to establish communication between the passage 21, which at this time is supplied with air pressure through the valve 36 if the magnet valve 25 is deënergized, and the passage 32. Air pressure is thereby applied to the top of the valve piston 12 which thereupon moves downwardly and by means of the rod 24 opens the valve 22 to establish communication between the brake cylinder 8 and atmosphere through the passages 15 and 17, the cavity of the slide valve 52 and port 53 of the valve device 50. The area of the top of the piston 12 which is exposed to the air pressure supplied through the passage 32 is larger than the area of valve 22 which is exposed to the pressure in the brake cylinder so that the pressure supplied through the passage 32 overcomes the pressure of the spring 23. The lower side of the piston 12 is connected to the passage 17 by means of a passage 26 so that air will not be trapped under the lower side of this piston and thereby prevent it from moving promptly to its lower position when the release magnet valve is energized.

If it is desired to effect an automatic application of the brakes, the motorman's valve 4 is moved to the service position in which communication between the brake pipe 5 and atmosphere is established thereby reducing the brake pipe pressure to operate the triple valve in the ordinary way to supply air from the auxiliary reservoir 7 to the brake cylinder 8. Since the pressure in the auxiliary reservoir is reduced by an application of the brakes the piston 51 of the valve device 50 is moved to the left hand side of the piston chamber as viewed in the drawing since the pressure on the control pipe exceeds at this time the pressure in the auxiliary reservoir. When the piston 51 occupies this position, the slide valve 52 cuts off communication between the exhaust port 53 and the port 54 leading to the passage 17 and establishes communication between the exhaust port 53 and the port 55 connected by pipe 56 to the exhaust port of the triple valve so that the brakes can only be released pneumatically. The brakes may be released in the usual way by increasing the pressure in the brake pipe 5 thereby causing the triple valve 6 to establish communication between the brake cylinder 8 and the pipe 56 which is connected to atmosphere through the passages 53 and 55 of the valve device 50. The slide valve 52 at the time it establishes communication between the exhaust pipe 56 and exhaust port 53 is arranged to blank the passage 17 so that in case the release valve 22 fails to close for any reason thereby maintaining the connection between the brake cylinder passage 15 and the passage 17 open, the brakes may still be operated pneumatically as would not be the case if the passage 17 were connected directly to atmosphere.

In case it is desired to make a quick emergency application of the brakes, this may be accomplished by simultaneously energizing the coil 27 of the application magnet valve 25 and venting air from the brake pipe 5 by any suitable means such as by means of the brake valve 4. The energization of the coil 27 establishes communication between the control pipe 3 and the brake cylinder passage 15 in the manner above described and the venting of air from the brake pipe 5 causes the triple valve 6 to operate in a well known manner to establish communication between the auxiliary reservoir 7 and the brake cylinder 8. Therefore, since two sources of air pressure are connected directly to the brake cylinder 8, it will be obvious that a very quick application of the brakes will be produced. The piston 51 of the valve device 50 will be moved to the right-hand side of the piston chamber at this time, since the passage 21 is connected directly to atmosphere, whereas the air pressure in the auxiliary reservoir 7 is not completely exhausted by a pneumatic application of the brakes. The brakes may, therefore, be released by energizing the coil 30 of the release magnet valve 37.

While I have shown and described one embodiment of my invention it will be obvious that various modifications and changes may be made therein and I aim to cover all such modifications and changes in the appended claims.

What I claim as new and desire to secure by Letters Patent of the United States, is:—

1. In an electropneumatic brake, the combination with a control pipe, brake pipe, auxiliary reservoir, brake cylinder and triple valve, of a piston subject to the opposing pressures of the control pipe and auxiliary reservoir, a valve operated by said piston controlling the exhaust port of said triple valve, and an electrically controlled valve for venting fluid from the control pipe side of said piston to effect the operation of said valve to cut off communication through the exhaust port of the triple valve.

2. In an electropneumatic brake, the combination with a control pipe, brake pipe, auxiliary reservoir, brake cylinder and triple valve, of a piston subject to the opposing pressures of the control pipe and auxiliary reservoir, a valve operated by said piston controlling the exhaust port of said triple valve, and an electrically controlled valve for cutting off the supply of fluid to the control pipe side of said piston and for venting fluid from said control pipe side of said piston to effect the operation of said valve to cut off communication through the exhaust port of the triple valve.

3. In an electropneumatic brake, the combination with a control pipe, brake pipe, auxiliary reservoir, brake cylinder and triple valve, and a brake cylinder pipe, of a piston subject to the opposing pressures of the control pipe and auxiliary reservoir, a valve operated by said piston controlling the exhaust port of said triple valve, an application valve controlling communication between said control pipe and said brake cylinder pipe, and an electrically controlled valve for effecting the operation of said application valve to establish communication between said control pipe and said brake cylinder pipe and for venting fluid from the control pipe side of said piston to effect the operation of said valve to cut off communication through the exhaust port of the triple valve.

4. In an electropneumatic brake, the combination with a control pipe, brake pipe, auxiliary reservoir, brake cylinder and triple valve, and a brake cylinder pipe, of a normally closed application valve controlling communication between the control pipe and the brake cylinder pipe, said application valve comprising a piston subject on both sides to the control pipe pressure, a valve device comprising a piston subject to the opposing pressures of the control pipe and auxiliary reservoir for controlling the exhaust port of the triple valve, and an application magnet valve arranged to cut off the supply of control pipe pressure to one side of said application valve and to the control pipe side of the piston of said valve device and to vent pressure therefrom to effect the opening of said application valve and the operation of said valve device to cut off communication through the exhaust port of the triple valve.

5. In an electropneumatic brake, the combination with a control pipe, brake pipe, auxiliary reservoir, brake cylinder, and triple valve, and a brake cylinder pipe, of a piston subject to the opposing pressures of the control pipe and auxiliary reservoir, a valve device operated by said piston for controlling the exhaust port of the triple valve and a passage between the brake cylinder pipe and atmosphere, an application magnet valve adapted to vent fluid from said control pipe side of said piston to cause said valve device to cut off communication through the triple valve exhaust port and to open said passage between the brake cylinder pipe and atmosphere and a release magnet valve controlling the communication between said brake cylinder and atmosphere through said passage.

6. In an electropneumatic brake, the combination with a control pipe, brake pipe, auxiliary reservoir, brake cylinder and triple valve, and a brake cylinder pipe, of a normally closed application valve controlling communication between the control pipe and the brake cylinder pipe, said application valve comprising a piston subject on both sides to the control pipe pressure, a normally closed release valve controlling communication between the brake cylinder pipe and atmosphere, said release valve comprising a piston adapted when subject to fluid pressure to open said release valve, a release magnet valve adapted to establish communication between said control pipe and the release valve piston to effect the opening of said release valve, a valve device comprising a piston subject to the opposing pressures of the control pipe and auxiliary reservoir for controlling the exhaust port of the triple valve, and the communication controlled by the release valve and an application magnet arranged to cut off the supply of control pipe pressure to one side of said application valve, the control pipe side of said valve device and the piston of said release valve.

In witness whereof, I have hereunto set my hand this 14 day of January, 1921.

GEORGE MACLOSKIE.